US 7,630,373 B2

(12) United States Patent  (10) Patent No.: US 7,630,373 B2
Okuno  (45) Date of Patent: Dec. 8, 2009

(54) PACKET TRANSFER APPARATUS

(75) Inventor: Michitaka Okuno, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 444 days.

(21) Appl. No.: 11/411,023

(22) Filed: Apr. 26, 2006

(65) Prior Publication Data

US 2006/0253606 A1   Nov. 9, 2006

(30) Foreign Application Priority Data

May 6, 2005  (JP) ............................. 2005-134733

(51) Int. Cl.
*H04L 12/28* (2006.01)
(52) U.S. Cl. .................... 370/392; 370/401; 709/223
(58) Field of Classification Search .............. 370/401, 370/392; 709/223; 718/100
See application file for complete search history.

(56) References Cited

U.S. PATENT DOCUMENTS

2004/0030766 A1* 2/2004 Witkowski .................. 709/223
2004/0249803 A1* 12/2004 Vankatachary et al. ......... 707/3
2006/0064689 A1* 3/2006 Zhang ........................ 718/100

FOREIGN PATENT DOCUMENTS

JP  2004-221807  8/2004

OTHER PUBLICATIONS

RFC1519, Sep. 93, Classless Inter-Domain Routing (CIDR): an Address Assignment and Aggregation Strategy, pp. 1-20.
"Next Generation Routers" by H. Chao., pp. 1518-1558., Proceedings of the IEEE, vol. 90, No. 9, Sep. 2002.
IDT White Paper "Optimum Search Methods for Swithc/Router Databases in Access and Metro Edge Networks" by M. Miller, et al. Jan. 2003, pp. 1-24.

* cited by examiner

*Primary Examiner*—Dang T Ton
*Assistant Examiner*—Wei Zhao
(74) *Attorney, Agent, or Firm*—Mattingly & Malur, P.C.

(57) ABSTRACT

In a packet transfer apparatus, a larger number of entries can be registered to routing tables without increasing the overall memory volume required for the routing tables to record transfer information of packets. A routing table search is conducted at a high speed. Each line card of the packet transfer apparatus includes two kinds of routing tables, i.e., first and second routing tables having mutually different functions. The first routing tables are local routing tables to record frequently used transfer information in groups. The second routing tables are shared distributed routing tables and record the transfer information in a distributed way without an overlapped part of the transfer information between the line cards. The sum of the distributed transfer information matches the overall transfer information kept in the packet transfer apparatus.

12 Claims, 10 Drawing Sheets

| PREFIX | NEXT HOP IP ADDRESS | OUTPUT PORT NUMBER | |
|---|---|---|---|
| 1 1 1 1 1 0 1 0 | A | 4 | ~1000-1 |
| 0 1 1 1 1 * * * | B | 3 | ~1000-2 |
| 0 1 1 0 * * * * | C | 1 | ~1000-3 |
| 1 0 1 0 * * * * | D | 5 | ~1000-4 |
| 1 0 1 * * * * * | E | 4 | ~1000-5 |
| 0 1 * * * * * * | F | 2 | ~1000-6 |

1000

FIG.7A
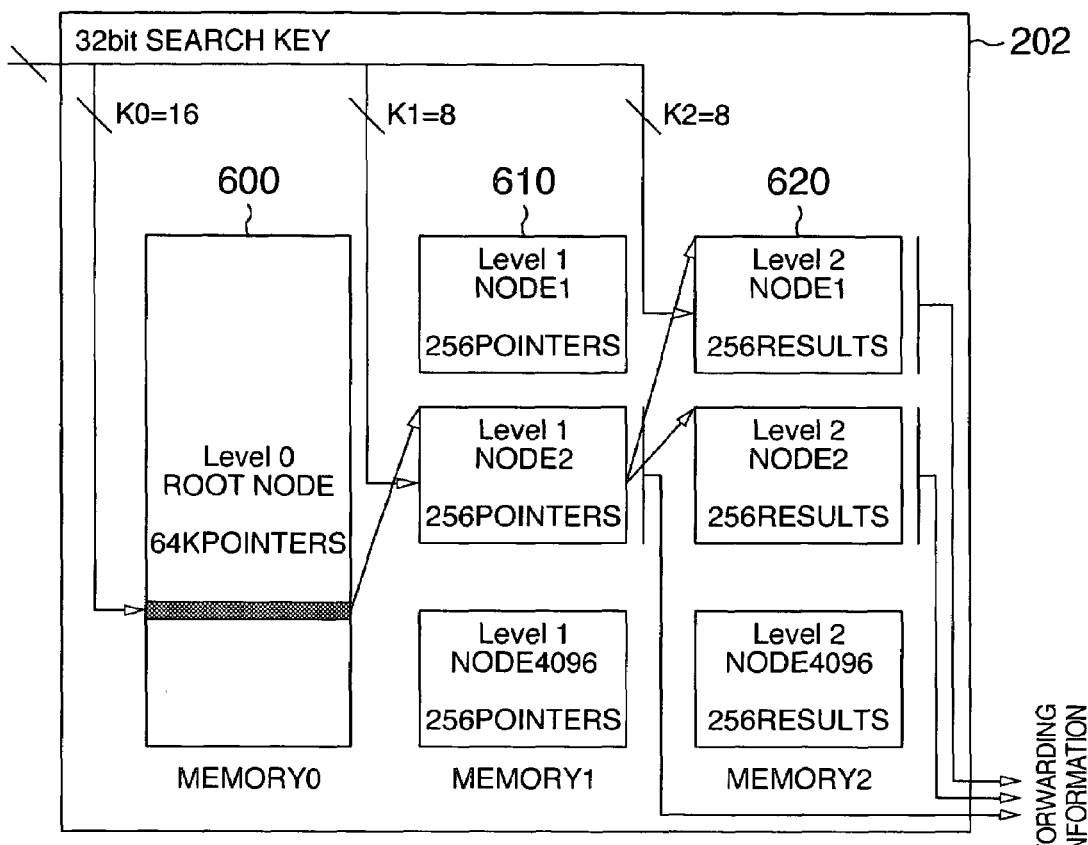
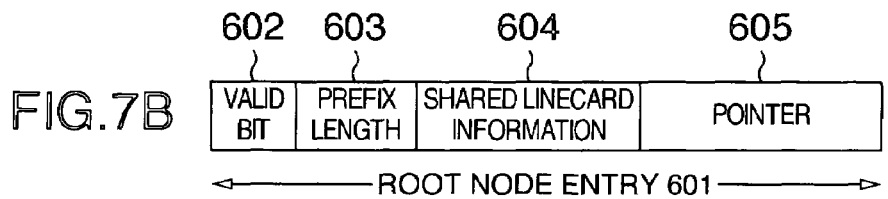
FIG.7B
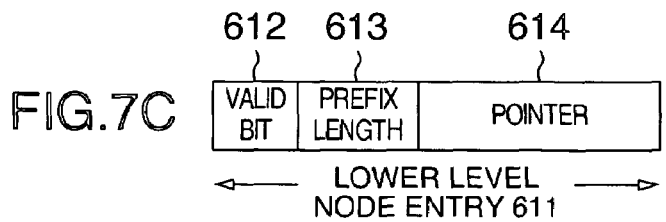
FIG.7C
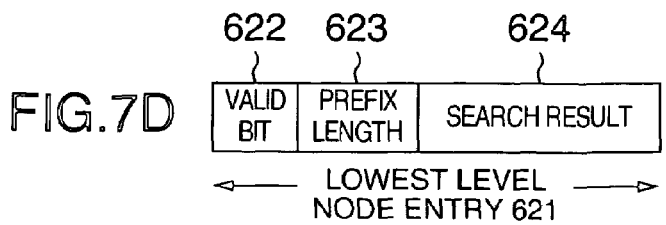
FIG.7D

PACKET TRANSFER APPARATUS

INCORPORATION BY REFERENCE

The present application claims priority from Japanese application JP2005-134733 filed on May 6, 2005, the content of which is hereby incorporated by reference into this application.

BACKGROUND OF THE INVENTION

The present invention relates to a method of configuring a routing table (route search table) used in a packet transfer apparatus arranged at a network relay point.

Due to rapid increase in recent Internet traffic, higher-speed packet transfer techniques are required for a packet transfer apparatus arranged at network relay points. When a packet is received, the packet transfer apparatus determines, according to a destination address included in the packet, one of the networks connected to the packet transfer apparatus and then transfers the packet to the network. To determine the packet transfer destination according to the destination address included in the packet, the packet transfer apparatus uses a routing table (route search table).

The routing table includes a plurality of route entries. Each route entry includes a prefix, i.e., the upper bits of an Internet Protocol (IP) address which indicate a network and a next hop IP address and an output port number which correspond to the prefix. When a packet is received as an input, the packet transfer apparatus searches the routing table for a route entry of which the prefix matches the upper bits of the destination IP address of the packet to recognize the contents of the route entry as the next hop IP address and the output port number for the input packet.

The destination search operation is a process which is possibly a bottleneck in the packet transfer process. The higher the communication speed of the network is, the more serious the problem of the bottleneck is. Additionally, due to increase in the recent Internet traffic, the number of registration entries required for the routing table becomes greater. This also is a problem of the packet transfer apparatus. To cope with the problems, as described in RFC1519, Classless Inter-Domain Routine (CIDR) in which an IP address is divided into a network address and a host address according to an arbitrary prefix position was introduced for an efficient use of an IP address space about the middle of 1990. CIDR slightly lowered the growth rate of the number of required entries in the routing table. However, according to Internet Protocol version 4 (IPv4) Border Gateway Protocol (BGP) Report, the number of routing table entries required for a packet transfer apparatus in the network core reached about a little more than 180 thousand at the end of 2004.

CIDR brings about an advantage of reduction in the number of entries required to be stored in the routing table. However, CIDR requires "longest prefix match" in the search and hence causes at the same time a disadvantage that the routing table search process becomes complicated. That is, there exists possibility that a plurality of entries of the routing table match the search condition as a result of the search. Therefore, it is required to select, from the entries as the search result, one entry including the largest number of bits matching the search condition (longest prefix match).

The routing table search will be concretely described by use of a routing table shown in FIG. 2. The routing table 1000 of FIG. 2 includes six entries 1000-1 to 1000-6 in which the IP address is expressed by eight bits. Each entry (1000-1 to 1000-6) includes an IP address condition which is information equivalent to a prefix and a next hop IP address and an output port number which correspond to the IP address condition. The IP address condition is information including a prefix expressed by the upper bits and a mask (*) expressed by the remaining bits of the IP address. For example, "01111*" of the entry 1000-2 indicates that the upper five bits are "01111" and the lower three bits may be either one of "000", "001", "010", "011", "100", "101", "110", and "111". Additionally, "01111*", "0110**", "1010", "101*", and "01****" respectively of the entries 1000-2 to 1000-6 may also be expressed as "01111/5", "0110/4", "1010/4", "101/3", and "01/2", respectively. The numeral after the slash is called "prefix length" and indicates the length of the portion of the prefix excepting the mask.

Assume that a packet with, for example, a destination address "01111010" in binary notation is inputted to the packet transfer apparatus. In this case, although the IP address conditions respectively of two entries 1000-2 and 1000-6 match the destination IP address of the input packet, the entry 1000-2 has the longer prefix length and hence the next hop IP address B and the output port number 3 of the entry 1000-2 are determined as the match result.

To increase the operation speed of the routing table search, a recent high-end packet transfer apparatus employs a memory device called "Ternary Contents Addressable Memory (TCAM)" in many cases. For example, "Next Generation Routers" invited paper, IEEE Proceeding, vol. 90, no. 9, pp. 1518-1558, September 2002 and IDT White Paper "Optimum Search Methods for Switch/Router Databases in Access and Metro Edge Networks" describe a method in which the routing table search and the flow discrimination process are implemented at a high speed using the TCAM.

In the TCAM, for each bit of the matching condition, it is possible to designate three kinds of values, namely, "0", "1", and "* (Don't Care Mark)". The TCAM includes a plurality of entries each of which stores a matching condition including a plurality of bits. When a search key is inputted thereto, the TCAM compares the search key with the matching condition of each entry simultaneously for all entries. The TCAM selects, from the addresses of entries matching the search condition, an address value with a highest priority level (e.g., the smallest address value) to output the address value therefrom. By beforehand storing an IP address condition having the longest prefix in an entry of a higher priority level, the TCAM can achieve the longest prefix match.

The TCAM is a memory device suitable for the high-speed routing table search. However, when compared with a Dynamic Random Access Memory (DRAM) and a Static Random Access Memory (SRAM), the TCAM has a problem. That is, power consumption of the TCAM is greater than that of the DRAM and the SRAM by about two orders of magnitude, the integration degree thereof is lower than that of the DRAM and the SRAM, and the TCAM is most expensive.

In a packet transfer apparatus of today, a control card 300 includes the routing table 301 and each line card 100-i (i=1 to N) includes a perfect routing table 210 as shown in FIG. 3. The perfect routing table 210 is disposed to search routing table information at a high speed in an independent way and includes a copy of the contents of the routing table 301, the contents being configured in a format suitable for the hardware to conduct the search. In high-end packet transfer apparatuses in recent years, the TCAM is employed for the routing table of each line card depending on cases.

JP-A-2004-221807 describes a method in which the routing table and the search engine thereof are improved in a network transfer apparatus. To enlarge the capacity, to reduce delay in operation (to increase the operation speed), and to lower the cost of the network transfer apparatus, routing table information of the control card is divided into subset information groups to be allocated as distributed routing tables in the respective line cards. Additionally, each distributed routing table includes a routing table cache to store therein a copy of a part of the information contained in the routing table. If a search does not hit any information item in a routing table cache, a search is made for a destination through the routing table corresponding to the routing table cache.

SUMMARY OF THE INVENTION

Since transfer information corresponding to a destination address is increasing day by day, it is necessary to increase the memory volume required for the routing table to record the transfer information to be loaded in each line card of the packet transfer apparatus. Due to the increasing tendency of the memory volume, there exists a fear that the memory volume required for each line card exceeds the allowable range to mount the memory. Therefore, it is required to increase the number of entries which can be registered to the routing table, without increasing the total memory volume. Since the routing table search is a process which is likely to be a bottleneck in the packet transfer apparatus, it is necessary to conduct the route search at a high speed.

In the method in which the copy of the routing table 301 in the control card 300 is stored in the TCAM mounted in each line card 100 as shown in FIG. 3, when it is desired to use a larger-capacity routing table, it is required to increase capacity of the TCAM mounted in the line card 100. This leads to a problem of increase in the power consumption of overall packet transfer apparatus and the cost thereof.

As described in JP-A-2004-221807, the method in which basically only one routing table is mounted in the packet transfer apparatus and each line card is allocated with a part of the routing table in a distributive fashion is promising since the memory volume to be mounted in the packet transfer apparatus only slightly increases even if the routing table capacity becomes larger. However, in a case in which a plurality of line cards make a search through the routing table of a particular line card, there arises a problem. That is, only by distributing each part of the routing table, the search speed is lowered due to memory contention. Therefore, it is essential in JP-A-2004-221807 to mount the routing table cache. However, since the routing table cache can store only entries of destination address information items which perfectly match, possibility of a cache miss increases. This hence leads to a drawback of long latency to be lapsed before corresponding IP address information is stored in the cache at cache miss.

It is therefore an object of the present invention, which has been devised to remove the above problems, to provide a packet transfer apparatus wherein by disposing two kinds of routing tables in each line card, the routing table can be increased in capacity, that is, the number of entries registrable to the routing table can be increased. Another object of the present invention is to increase the operation speed of the routing table search.

According to the present invention, each line card of the packet transfer apparatus includes two kinds of routing tables, specifically, first and second routing tables having mutually different functions. The first routing table is a local routing table dedicated to the own line card to record as a group of transfer information items to be frequently used. The second routing table is a shared distributed routing table in which transfer information items are recorded such that the transfer information items are mutually different from those of the other line cards. When all distributed information items are collected, the resultant distributed information items match all transfer information items kept in the packet transfer apparatus.

Each line card can use locality of destination search depending on a network line connected thereto, namely, a property of likeliness of appearance of a perfectly or completely the same address or an address of which the upper part of the prefix is the same. Therefore, it is not necessary for the local routing table to record at once all transfer information items which the packet transfer apparatus keeps. And hence the local routing table may be implemented using a memory of relatively small capacity. When searching a packet destination, each line card first searches the local routing table. If concerned transfer information is present therein, the line card uses the concerned transfer information. Otherwise, the line card copies all transfer information items determined to be related to the destination address used in the search from the corresponding shared distributed routing tables onto the local routing table and then uses the transfer information items.

By using the shared distributed routing table, a larger number of entries are registrable to the routing table without increasing the total memory volume in the packet transfer apparatus. Thanks to the local routing table, the own line card can use frequently used transfer information items without any hindrance from the other line cards. Therefore, the routing table search can be conducted at a high speed.

Since all transfer information items determined to be related to the destination address are copied from the shared distributed routing tables onto the local routing table, the search through the shared distributed routing table is less frequently conducted when compared with a simple cache scheme in which only one transfer information item perfectly corresponding to the destination address is copied. Therefore, it is possible to remove the memory access bottleneck occurring when a plurality of line cards search the shared distributed routing tables.

Other objects, features and advantages of the invention will become apparent from the following description of the embodiments of the invention taken in conjunction with the accompanying drawings.

BRIEF DESCRIPTION OF THE DRAWINGS

FIG. 7A is a diagram showing a configuration example and contents of entries of a shared distributed routing table according to an embodiment.

FIG. 7B is a diagram showing an example of a root node entry.

FIG. 7C is a diagram showing an example of a lower-level node entry.

FIG. 7D is a diagram showing an example of a lowest-level node entry.

DESCRIPTION OF THE EMBODIMENTS

Description will now be given in detail of an embodiment by referring to the accompanying drawings.

First Embodiment

Figure 1:
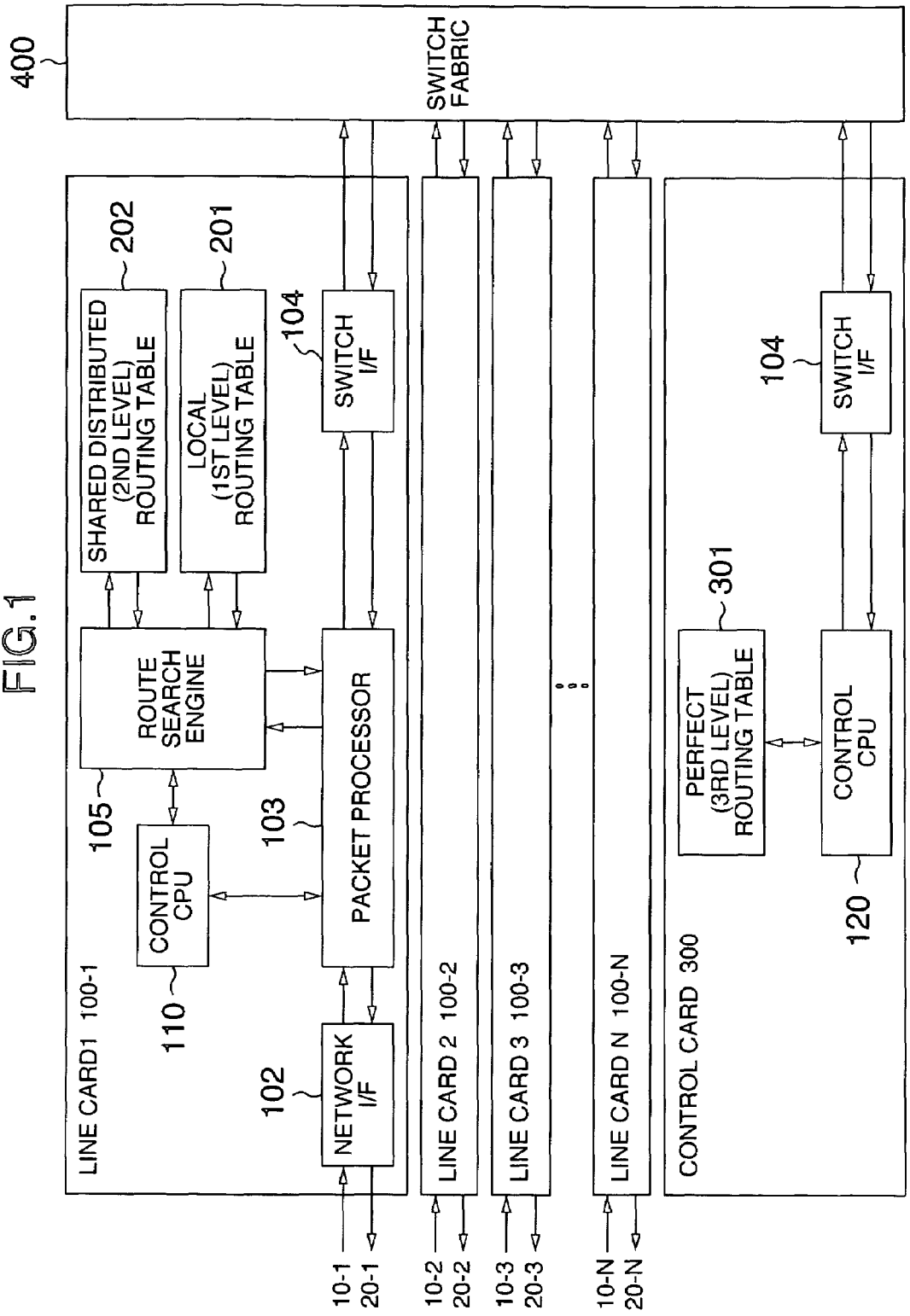
FIG. 1 is a block diagram showing an embodiment of a packet transfer apparatus according to the present invention.
Figure 2:
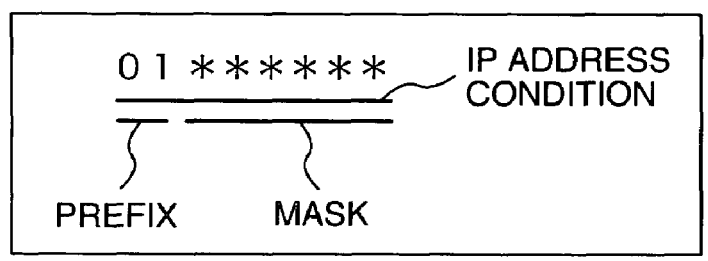
FIG. 2 is a schematic diagram to explain an example of a routing table including six entries according to the prior art.
Figure 3:
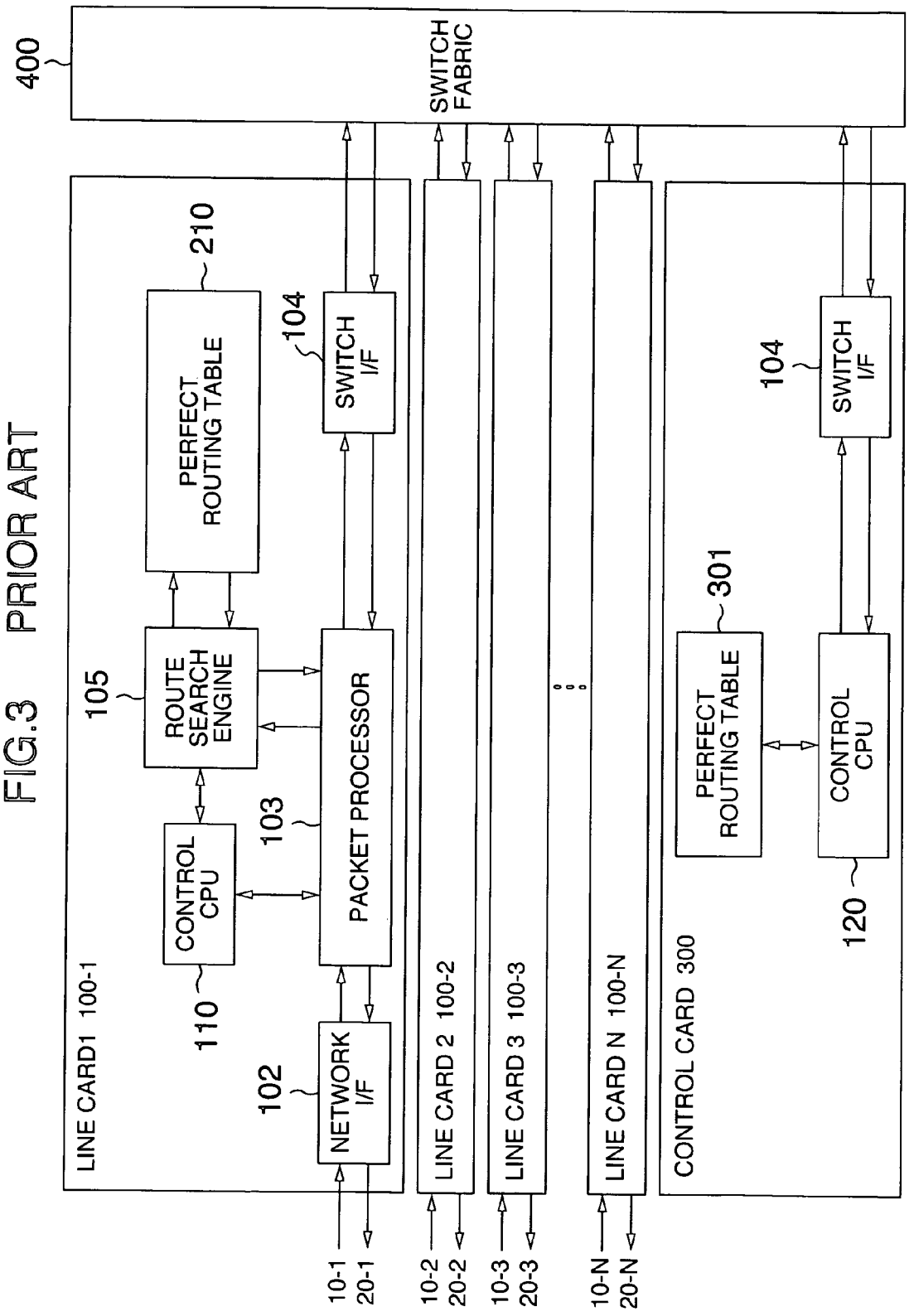
FIG. 3 is a block diagram showing an embodiment of a packet transfer apparatus according to the prior art.

FIG. 1 shows in a block diagram a packet transfer apparatus according to the present invention. The packet transfer apparatus includes N input lines 10-$i$ (i=1 to N) to input packets, N output lines 20-$i$ (i=1 to N), N line cards 100-$i$ (i=1 to N) to executes a sequence of packet processes, a control card 300 to control the overall packet transfer apparatus, and a switch fabric 400 to couple the line cards 100-$i$ with the control card 300.

The line card 100-$i$ includes a network interface 102 to communicate a packet with the network side, a packet processor 103 to execute packet processes, a route search engine 105 to make a routing table search of the packet processes, a first routing table (local routing table) 201 to keep therein transfer information used by the own line card, a second routing table (shared distributed routing table) 202 to share and to distribute transfer information between the line cards in the packet transfer apparatus, a switch fabric interface 104 to communicate a packet with the switch fabric 400, and a Central Processing Unit (CPU) 110 to conduct control operation.

The control card 300 includes a third routing table (perfect routing table) 301, a control CPU 120 and a switch fabric interface 104.

The control card 300 keeps therein the third routing table (perfect routing table) 301, which matches the sum or union of the shared distributed routing tables 202.

First, an outline of the operation of the packet transfer apparatus will be described. When a packet is inputted from the input line 10-$i$, the network interface 102 converts the packet into a packet in a format which can be recognized by the packet processor 103 and then transfers the packet to the packet processor 103.

The packet processor 103 holds the received packet therein and transfers a destination IP address extracted from the received packet to the route search engine 105.

The search engine 105 checks a next hop IP address and an output port number by use of the local routing table 201 and the shared distributed routing table 202 and transfers a result of the check to the packet processor 103. The packet processor 103 transfers the packet with the result to the switch fabric interface 104.

The switch fabric interface 104 transfers the received packet to the switch fabric 400, which in turn transfers the packet to a line card 100-$i$ corresponding to an output port number recorded in the received packet.

The line card 100-$i$ having received the packet transfers the packet via the switch fabric interface 104 to the packet processor 103. The packet processor 103 transfers a next hop IP address contained in the packet to the route search engine 105. The search engine 105 checks a next hop Media Access Control (MAC) address according to the hop IP address and transfers the address as MAC address information to the packet processor 103. The packet processor 103 writes the next hop MAC address in a destination MAC address of the packet, writes an MAC address of the network interface 102 of the own line card to replace the source MAC address, and transmits the packet to the output line 20-$i$.

Figure 4:
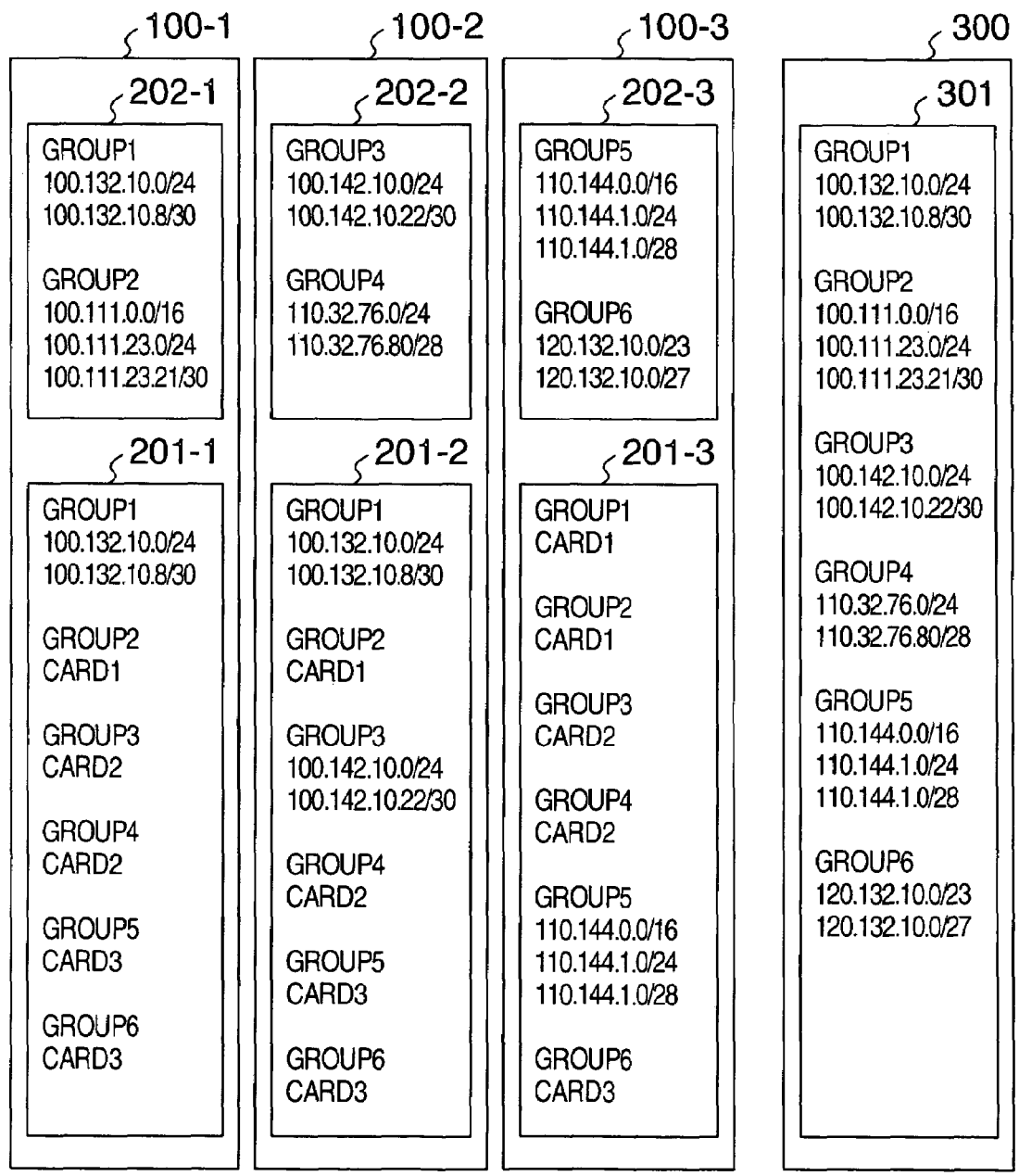
FIG. 4 is a diagram to explain an example of an inclusion relationship of first, second, and third routing tables.

Next, description will be given in detail of operation of the routing table control method and the search method in the packet transfer apparatus according to the present invention. First, FIG. 4 shows a relationship between the local routing tables 201-$n$ (n=1, 2, 3,), the shared distributed routing tables 202-$n$, and IP address conditions kept in the perfect routing table 301. For easy understanding of description, an IP address of IPv4 is employed as an example and the IP address conditions of only six groups are registered to the perfect routing table 301 in FIG. 4. Actually, the IP address conditions are registered for a larger number of groups. The address is not limited to the IPv4 address, that is, there may be used, for example, an IPv6 address.

The shared distributed routing tables 202-$n$ keep parts of registered information of the perfect routing table 301 without overlapped parts therebetween. In the example of FIG. 4, the shared distributed routing table 202-1 of the line card 100-1 keeps groups 1 and 2, the shared distributed routing tables 202-2 of the line card 100-2 keeps groups 3 and 4, and the shared distributed routing tables 202-3 of the line card 100-3 keeps groups 5 and 6. The control card 300 conducts grouping of the registered information.

In this case, a group indicates all address conditions to be checked when the longest prefix match is conducted. That is, in a case in which there exist a plurality of IP address conditions, if the prefix part of a first IP address condition is included in that of a second IP address condition, the first and second IP address conditions are assumed to belong to one group, i.e., the same group. For example, the prefix part of 100.132.10.8/30 is included in that of 100.132.10.0/24 in FIG. 4, and hence these IP address conditions belong to the same group. This also applies to groups 2 to 6.

If the prefix length is, for example, one, all IP address conditions belong to the same group. That is, the grouping is meaningless in this case. However, according to the data described in IPv4 BGP Report, the prefix length less than eight is not practically used in IPv4. Similarly, the prefix length less than 20 is practically not used in IPv6. Therefore, it is expectable that at least 256 groups are formed in IPv4 and at least one mega (1048576) groups are formed in IPv6.

Figure 5A:
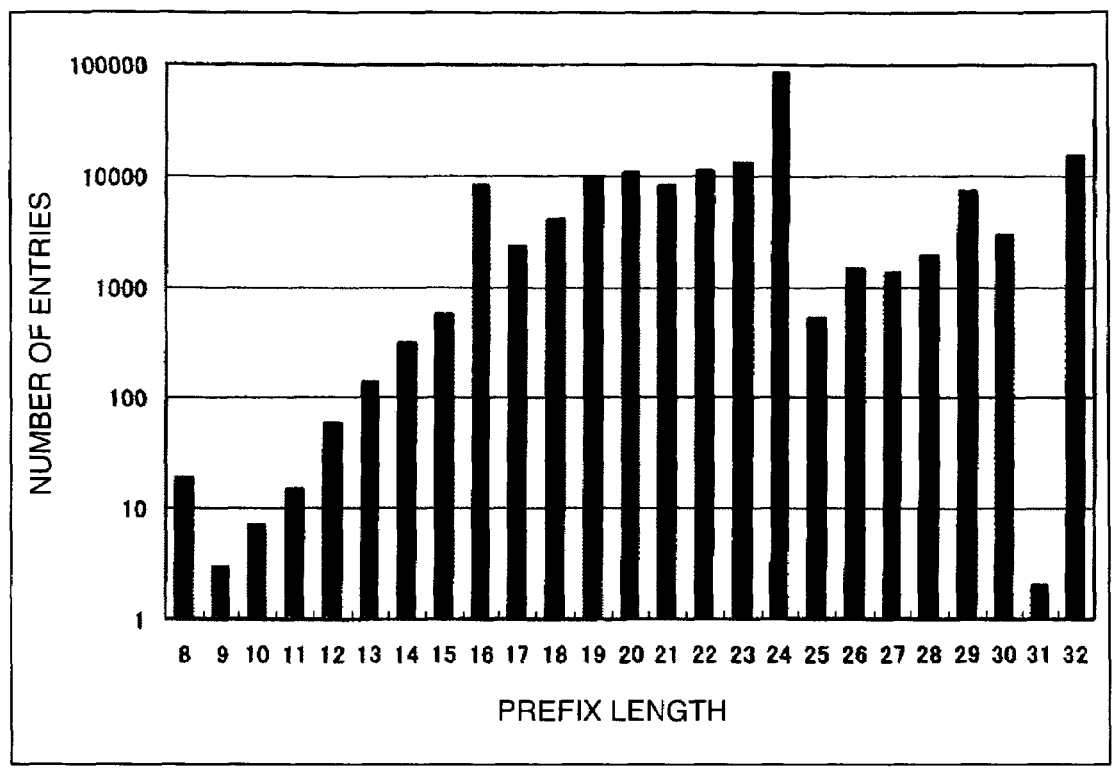
FIG. 5A is a graph showing an example of prefix length distribution, specifically, a relationship between the number of entries and the prefix length.
Figure 5B:
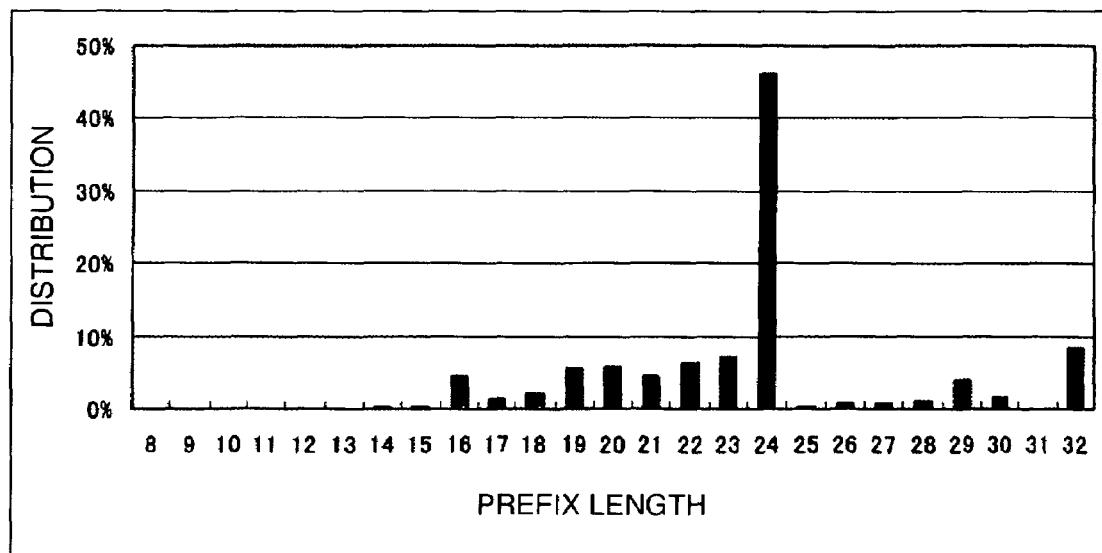
FIG. 5B is a graph showing an example of prefix length distribution, specifically, distribution of each prefix length.
Figure 6A:
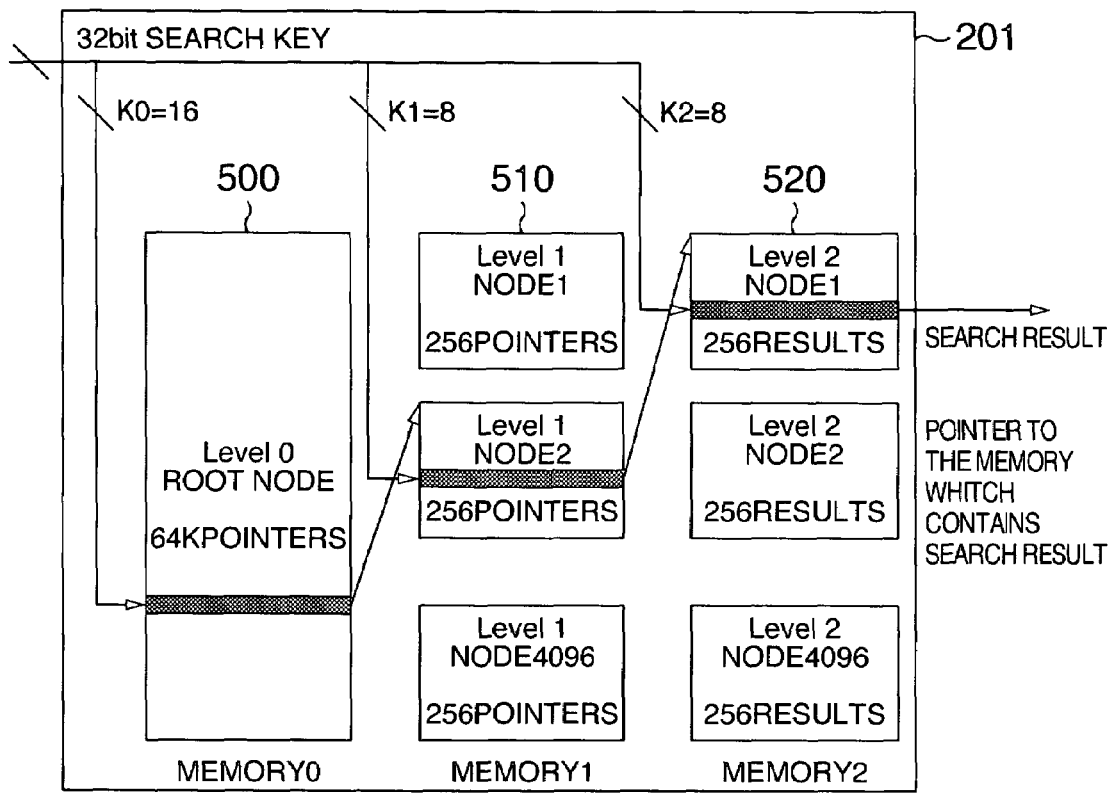
FIG. 6A is a diagram showing a configuration example and contents of entries of a local routing table according to an embodiment.
Figure 6B:
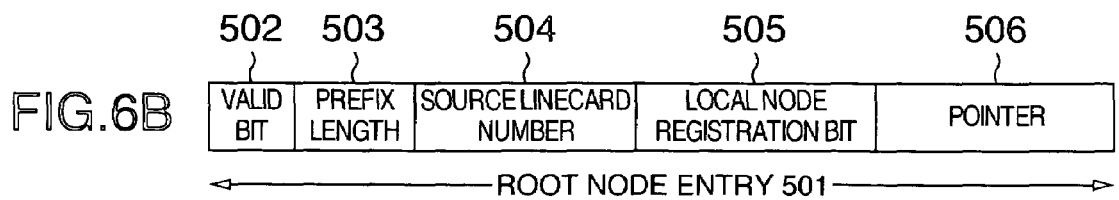
FIG. 6B is a diagram showing an example of a root node entry.
Figure 6C:
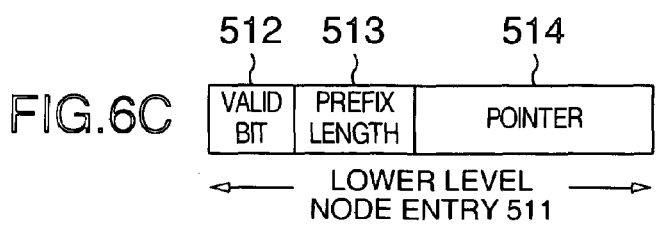
FIG. 6C is a diagram showing an example of a lower-level node entry.
Figure 6D:
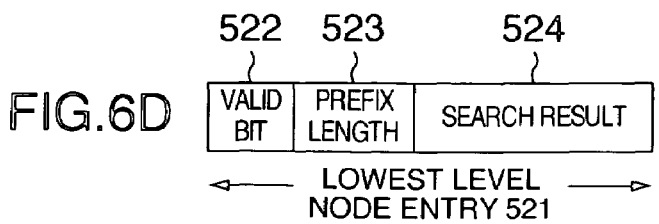
FIG. 6D is a diagram showing an example of a lowest-level node entry.

FIG. 5 shows a relationship between the prefix length and the number of entries as an example of a representative routing table of IPv4. It is considered that many routing tables of IPv4 have such tendency. The prefix length 24 occupies a large ratio of the entire length. The prefix lengths 16 to 23 follows the prefix length 24 in the ratio. In many cases, these nine kinds of prefix lengths 16 to 24 occupy about 80% of the entire length. If an IP address condition with a long prefix length is not included in an IP address condition of a short prefix length (if the IP address conditions belong mutually different groups), there exist groups of which the number is more than the minimum value described above.

For the local routing table 201, a group of the IP address conditions including an IP address used for the search are copied from the shared distributed routing tables. Ordinarily, a high-end packet transfer apparatus includes a plurality of (e.g., 16) line cards and network lines of which the number is equal to at least that of the line cards. It rarely occurs that a group of packets inputted from the network to a line card access all IP address areas. Therefore, it is likely that the group of particular IP address conditions to be frequent used vary between the line cards of the packet transfer apparatus. Using this property, it is not required for the local routing table 201 to keep the IP address conditions of all shared distributed routing tables 202, namely, the IP address conditions equivalent to those of the perfect routing table 301. Therefore, it is not necessarily required to use a local routing table 201 of quite a large size.

The example of FIG. 4 shows a state in which the local routing table 201-1 keeps a copy of the IP address conditions of group 1, the local routing table 201-2 keeps a copy of the IP address conditions respectively of groups 1 and 3, and the local routing table 201-3 keeps a copy of the IP address conditions of group 5. Each local routing table 201 keeps pointer information indicating the shared distributed routing tables keeping the groups of IP address conditions not kept in the local routing table 201. An IP address condition for which the pointer information is not existing is not registered to the perfect routing table 301, and hence the destination is unknown. Therefore, a default route destination is assumed.

Next, description will be given of an example of concrete configurations of the local routing table 201 and the shared distributed routing table 202 and then a method of registering and accessing an IP address condition.

Referring now to FIGS. 6A to 6D and FIGS. 7A to 7D, description will be given of examples of configurations of the local routing table 201 and the shared distributed routing table 202 according to an embodiment in which a Multi-level Trie (m-Trie) algorithm is applied to arrange a plurality of DRAMs or SRAMs in parallel without using the TCAM, to thereby keep more entries with the power consumption kept unchanged.

First, a destination IP address as a search key for use in the search is divided into a plurality of items. For IPv4, a 32-bit address is divided into, for example, three items including K0, K1, and K2. For example, K0=16 bits, K1=8 bits, and K2=8 bits in a representative dividing method. For each divided item, a node is generated for the search. In this example, the highest root node K0 includes $2^{16}$ entries. The node K1 at the lower level includes a plurality of nodes each including $2^{8}$ entries. The lowest node K2 also includes a plurality of nodes each including $2^{8}$ entries. In each of level-1 and level-2 nodes, the number of nodes is to be determined according to tradeoff with respect to the actually mountable memory items and is set to, for example, 4096. It is possible to construct each node using a plurality of DRAMs or SRAMs.

According to the upper 16 bits of the divided IPv4 destination IP address, an entry is selected from the root node to obtain a pointer to a level-1 node. According to the pointer, a level-1 node is selected. In the level-1 node, according to eight subsequent bits of the IPv4 destination IP address, an entry is selected from the level-1 node to obtain a pointer to a level-2 node. According to the pointer, a level-2 node is selected. According to eight last bits of the IPv4 destination IP address, an entry is selected from the level-2 node to obtain a pointer to a memory area having stored a search result, i.e., "next hop IP address and an output port number". Assume in the description below that the search result has been stored in the last-level node.

FIGS. 6A to 6D show an example of a configuration of the local routing table 201 for K0=16 bits, K1=8 bits, and K2=8 bits according to the m-Trie algorithm. The example includes one level-0 root node 500 including 64 entries, 4096 level-1 nodes 510 each including 256 entries, and 4096 level-2 nodes 520 each including 256 entries. The contents of each node entry will be described.

An entry 501 of the root-node includes a valid bit 502, a prefix length 503, a source line card number 504, a local node registration bit 505, and a pointer 506. If the valid bit 502 has been set, the concerned or pertinent entry is valid. The prefix length 503 is a prefix length of an IP address condition of the entry. The source line card number 504 indicates a line card number of a shared distributed routing table 202 in which the IP address condition has been recorded. The local node registration bit 505 indicates that the entry has been copied onto the local routing table 201. The pointer 506 is a pointer to select a level 1 node. In this example, the pointer 506 indicates one of the 4096 level-1 nodes.

An entry 511 of the level-1 node includes a valid bit 512, a prefix length 513, and a pointer 514 (to a level-2 node).

An entry 521 of the level-2 node includes a valid bit 522, a prefix length 523, and a search result 524.

FIGS. 7A to 7D show an example of a configuration of the shared distributed routing table 202 for K0=16 bits, K1=8 bits, and K2=8 bits according to the m-Trie algorithm. The example includes one level-0 root node 500 including 64 entries, 4096 level-1 nodes 510 each including 256 entries, and 4096 level-2 nodes 520 each including 256 entries. Although the shared distributed routing table 202 is configured almost in the same way as for the local routing table 201, the shared distributed routing table 202 may include more level-1 nodes and more level-2 nodes than the local routing table 201. The contents of each node entry will be described.

An entry 601 of the root-node includes a valid bit 602, a prefix length 603, shared line card information 604, and a pointer 605. If the valid bit 602 has been set, the concerned entry is valid. The prefix length 603 is a prefix length of an IP address condition of the entry. The shared line card information 604 indicates a line card number of a local routing table 201 onto which the concerned IP address condition has been copied. Since a plurality of line cards may share the concerned IP address condition, it is suitable to use a format in which one line card is represented by one bit. The pointer 605 is a pointer to select a level 1 node. In this example, the pointer 605 indicates one of the 4096 level-1 nodes.

An entry 611 of the level-1 node includes a valid bit 612, a prefix length 613, and a pointer 614 (to a level-2 node).

An entry 621 of the level-2 node includes a valid bit 622, a prefix length 623, and a search result 624.

Figure 8:
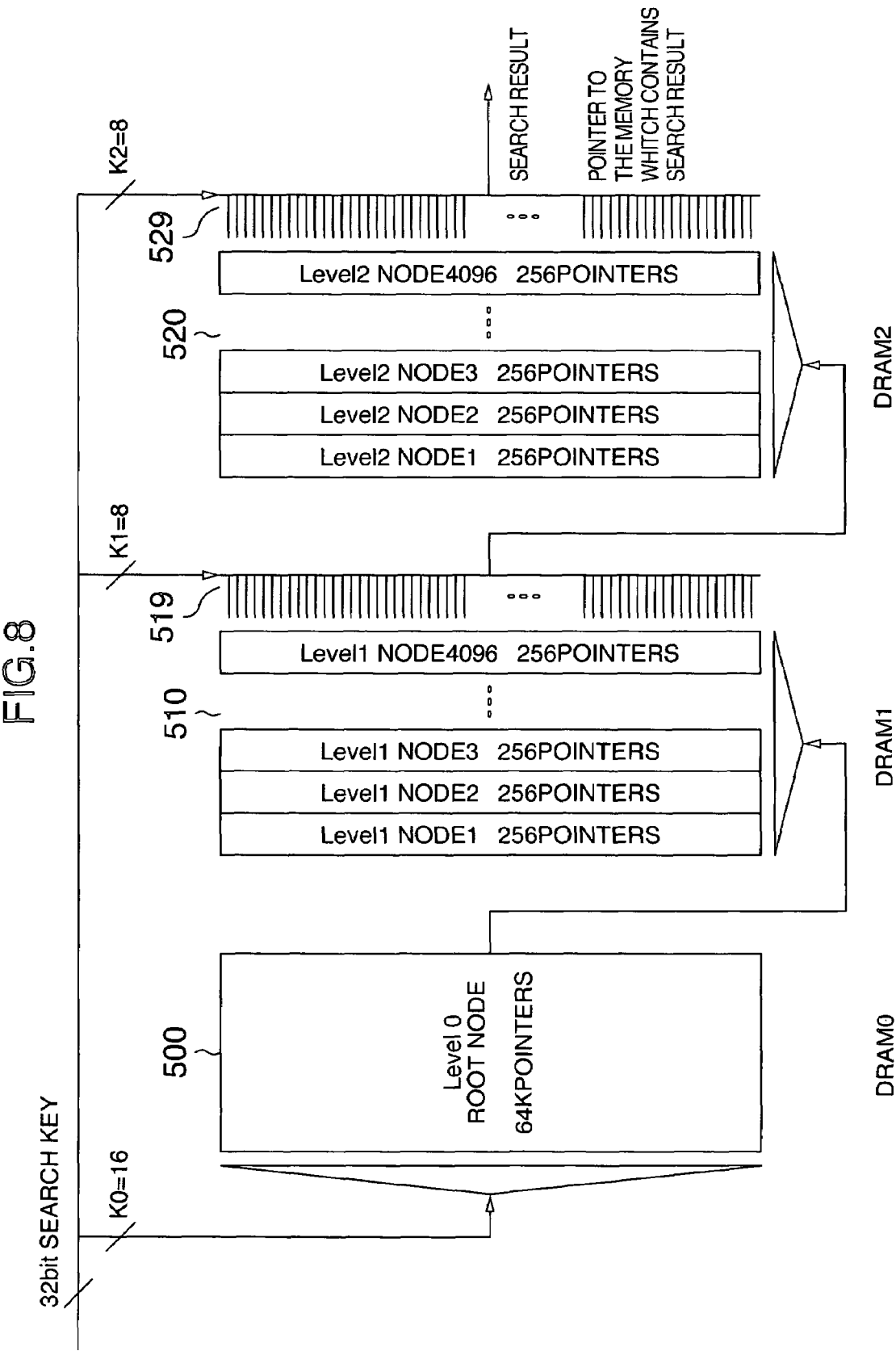
FIG. 8 is a diagram to explain an example of physical configurations of a local routing table and a shared distributed routing table.

As described above, each node of the local routing table 201 and the shared distributed routing table 202 includes DRAMs or SRAMs, not the TCAM. FIG. 8 shows an example of a configuration of the node including DRAMs. The respective tables are basically in the same configuration with each other. Each of the tables includes a root node 500, level-1 nodes 510 each including 4096 nodes selectable using a row address, a selector 519 including entries of 256 level-1 nodes selectable using a column address, level-2 nodes 520 each including 4096 nodes selectable using a row address, and a selector 529 including entries of 256 level-2 nodes selectable using a column address.

The respective nodes include independent DRAMs, respectively. The DRAMs may include Double Data Rate-Synchronous DRAM (DDR-SDRAM) and a Fast Cycle RAM (FCRAM) in a general package or may be configured as an embedded DRAMs in an LSI package of the route search engine 105. Although the production cost of embedded DRAMs is high, the embedded DRAMs are advantageous that the access latency is reduced and a large volume of data can be communicated at a time between each DRAM and the route search engine 105 through a dedicated wide-width bus in the DRAM.

Description will now be given of operation to register an IP address condition as a new item to the packet transfer apparatus by referring to the flowchart of an updating operation example of a shared distributed routing table of invalidation type shown in FIG. 10. In this connection, "invalidation type" means that in the update of the shared distributed routing table 202, the concerned entry is discarded (invalidated) in a local routing table 201 having a corresponding IP address condition.

The perfect routing tables kept by the packet transfer apparatus are controlled using a perfect routing table 301 included in a control card 300. When a new IP address condition is added to the perfect routing table 301 (801→802 in FIG. 9), the control card 300 registers the IP address condition in the entry format shown in FIG. 7 to all entries related to nodes in the corresponding shared distributed routing table 202 (803 of FIG. 9).

In this regard, if the IP address condition is 111.222.3.4/15, "related entries" include two entries 111.222 and 111.223 in the root node 500. The pointers 506 of both entries indicate a shared node in the level-1 node 510. Since the prefix length is "15", the 256 entries of the nodes in the level-1 and level-2 nodes are regarded as related entries.

Similarly examples are as follows. If the IP address condition is 111.222.3.4/14, the related entries include four entries 111.220, 111.221, 111.222, and 111.223 in the root node 500. The pointers 506 of the entries indicate a shared node in the level-1 node 510. Since the prefix length is "14", the 256 entries of the concerned nodes in the level-1 and level-2 nodes are regarded as related entries.

If the IP address condition is 111.222.3.4/24, there exists only one entry as the related entry, i.e., 111.222 in the root node 500. The pointer 506 of the entry indicates one node in the level-1 node 510. In the node of the level-1 node 510, entry 3 indicated by eight bits following the IP address condition is the related entry. In the level-2 node 520, since the prefix length is "24", the 256 entries of the level-2 node are regarded as related entries.

If the IP address condition is 111.222.3.4/30, there exists only one entry as the related entry, i.e., 111.222 in the root node 500. The pointer 506 of the entry indicates one node in the level-1 node 510. In the node of the level-1 node 510, entry 3 indicated by eight bits following the IP address condition is the related entry. In the level-2 node 520, since the prefix length is "28" and eight last bits is "4", four entries 4 to 7 of the level-2 node are regarded as related entries.

In summary, when the prefix length is represented as L, if L is less than 16 (L is ordinarily eight more according to the examples of FIGS. 5A and 5B), $2^{(L-16)}$ entries are filled with the same contents. All of 256 entries of each of the level-1 and level-2 nodes 510 and 520 are filled with the same contents.

Similarly, if L is equal to or more than 16 and less than 24, only one entry is used in the root node 500. In the concerned level-1 node 510, $2^{(24-L)}$ entries are filled with the same contents. All of 256 entries of the level-2 nodes 520 are filled with the same contents.

If L is equal to or more than 24, only one entry is used in the root node 500 as well as in the level-1 node. In the concerned level-2 node 520, $2^{(32-L)}$ entries are filled with the same contents. All of 256 entries of the level-2 nodes 520 are filled with the same contents.

Description has been given of examples of the related entry. If there exists no group including the IP address condition, there is created a new group. That is, a line card number of the shared distributed routing table 202 to which the group is registered is registered as "source line card number 504" to the root node of each local routing table 201. Thereafter, the valid bit 502 is set and then the update process is terminated (804→805→808 in FIG. 9).

Figure 9:
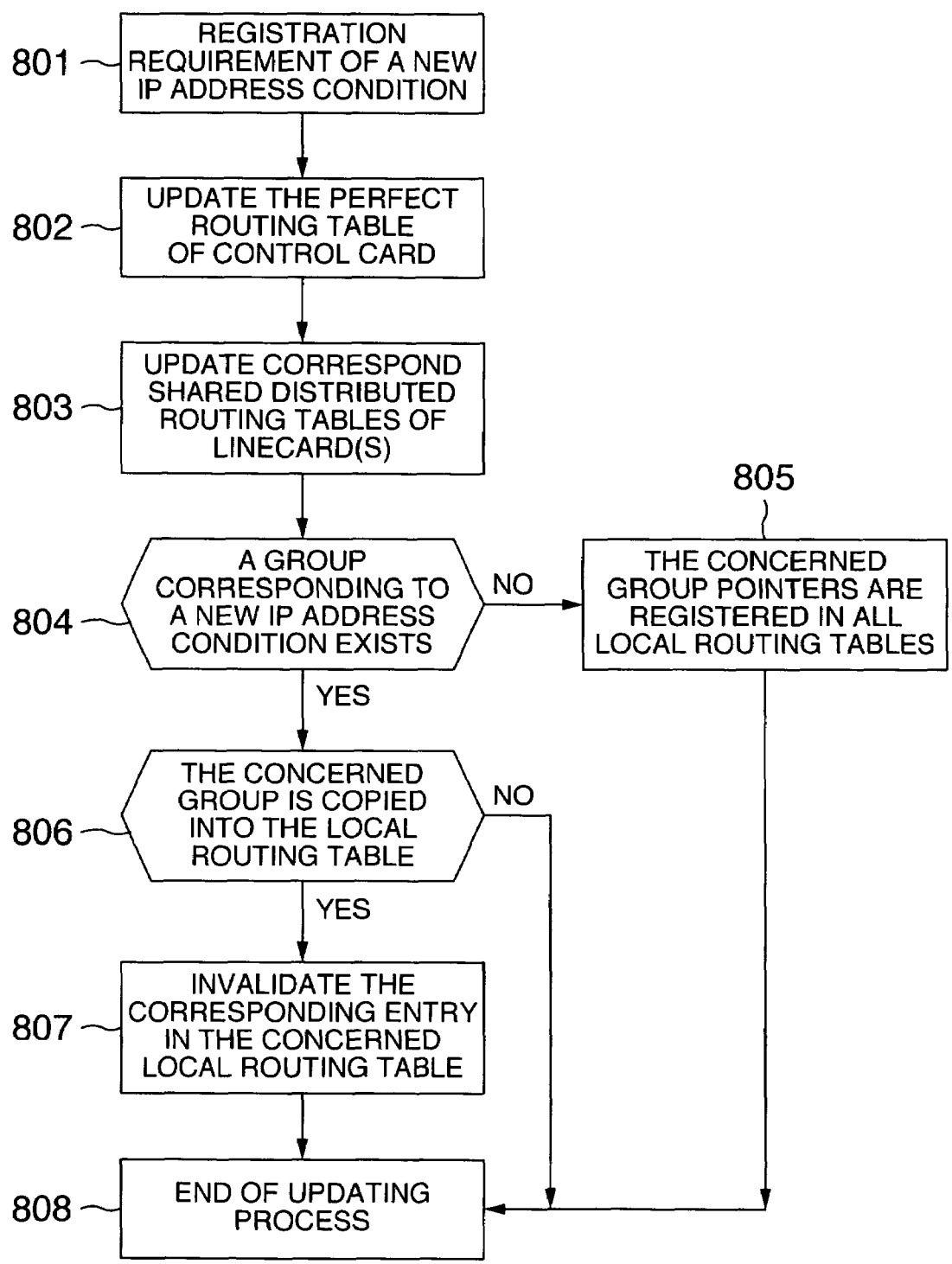
FIG. 9 is a flowchart showing an example of operation to update an invalidation-type shared distributed routing table.

If there exists a group including the IP address condition described above, a check is made to determine whether or not the concerned group has been copied onto either one of the local routing tables 201 by referring to the shared line card information 604 of the root node entry 601 of the shared distributed routing table 202 (806 of FIG. 9). If the group has been copied onto a local routing table 201, an invalidation-type or update-type process is conducted for the contents of the copy to maintain consistency of the local routing table information in the packet transfer apparatus. The invalidation-type process is advantageous in that control logic implementation is simpler than the update-type process. In the invalidation-type process, the address condition of the concerned local routing table 201 is invalidated to thereby terminate the update process (807→808 in FIG. 9). In the invalidating operation, by referring to the prefix length fields 503, 513, and 523 of the entries of relate nodes in the local routing table 201, only the IP address condition of the prefix length to which an invalidation request has been issued is invalidated. For example, if IP address conditions 111.222.0.0/16 and 111.222.0.0/24 have been registered, 111.222.0.0/24 is a branch entry of 111.222.0.0/16. In this situation, in an operation to invalidate 111.222.0.0/16, 111.222.0.0/24 is kept remained, i.e., is not invalidated.

For an update-type shared distributed routing table 202, not for the invalidation-type shared distributed routing table, the concerned IP address condition of the concerned local routing table 201 is updated to a new condition in step 807 of in FIG. 9 and then the process is terminated. In the update process, only the difference between the previous registration data and the current registration data is required to be transferred as the update information. Since it is more complex to control the update-type shared distributed routing table than the invalidation-type shared distributed routing table, logic implementation of the update-type shared distributed routing table is difficult. However, there exists an advantage of reduction in the volume of information communicated to control the routing tables.

Referring next to the flowchart shown in FIG. 10, description will be given of operation of the route search engine 105 of the line card 100 to conduct a route search. Using as a search key a destination IP address extracted from the received packet, the route search engine 105 makes a search through a root node 500 of the local routing table 201 (901→902 in FIG. 10). If an IP address condition matching the upper 16 bits of the search key exists in the root node 500 of the local routing table 201 (the local node registration bit 505 of the concerned entry has been set), the route search engine 105 repeatedly conducts the search, using the pointer 506 of the concerned entry, through the nodes in the subsequent levels until the last node is reached.

In this example, the level-1 node 510 is selected by the entry pointer 506 of the root node 500 to select an entry in the concerned level-1 node 510 using eight subsequent bits of the search key. Using the pointer 514 of the entry, the level-2 node 520 is selected. Using eight last bits of the search key, an entry of the concerned level-2 node 520 is selected. Through the operation above, there is obtained information (a next hop IP address and an output port number) as a result of the operation (903→907→908→907→908→909 in FIG. 10).

Figure 10:
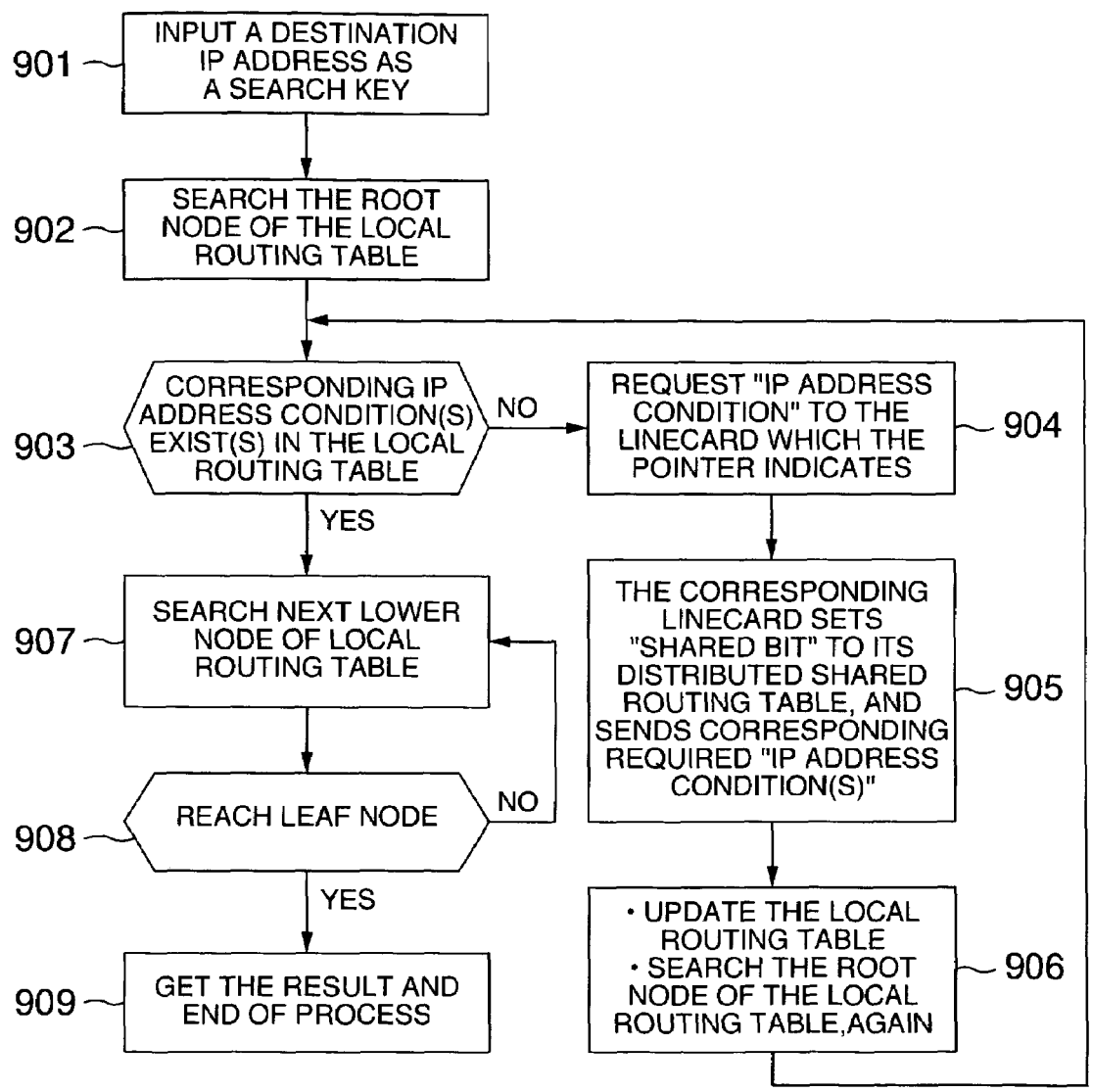
FIG. 10 is a flowchart showing an example of operation to search a routing table.

If the root node 500 of the local routing table 201 does not include an IP address condition matching the upper 16 bits of the search key, the route search engine 105 refers to the source line card number 504 to issue a request to a corresponding shared distributed routing table 202 for information of the IP address condition (903→904 in FIG. 10).

The corresponding shared distributed routing table 202 of the line card 100 reads corresponding entry information items from a root node 600, a level-1 node 610, and a level-2 node 620 to produce copies thereof and then collectively transmits the copies to the source line card 100. At the same time, a message of an event that the entry information is shared among particular line cards is recorded in a shared line card information field 604 of a root node entry 601 of the shared distributed routing table 202 (905 of FIG. 10).

The local routing table 201 of the source line card records the entry information transmitted as above in the corresponding root node 500, level-1 node 510, and level-2 node 520 and then makes a search through the root node 500 of the local routing table (906 of FIG. 10). In the search, since a target result has already been registered to the local routing table 500, the process goes through the flow of 903→907 in FIG. 10 described above to resultantly obtain a search result.

There possibly exists a situation in which nodes are insufficient in the level-1 node 510 and the level-2 node of the local routing table 201. At occurrence of insufficiency of the node entries, node entries being used are released to be changed to available node entries for the future use according to an algorithm such as a random algorithm, a First-In-First-Out (FIFO) algorithm, or a Least Recently Used (LRU) algorithm.

The released entries are not in the shared state when viewed from the shared distributed routing table 202. Therefore, an operation is conducted to update the contents of the shared line card information 604 of the concerned entry of the root node 600 in the corresponding shared distributed routing table 202.

Description has been given in detail of the first embodiment. By applying the shared distributed routing table 202 of the embodiment to the packet transfer apparatus, it is possible to reduce the memory volume required for the routing tables to be used in the entire packet transfer apparatus. From a different point of view, when compared with the conventional method, the registrable transfer information items can be increased in proportion to the number of line cards in the entire packet transfer apparatus.

Additionally, each line card can search frequently used transfer information at a high speed using the local routing table 201 dedicated to the line card. For the local routing table 201, it is not necessarily required to use the high-speed TCAM suitable for the longest prefix match, the TCAM consuming considerably high power and including a relatively small number of entries registered thereto. As described in conjunction with the embodiment, the local routing table 201 can operate at a high speed when DRAMs or SRAMs are used for the respective nodes for sequential access of nodes such that each node is accessed in one cycle in a node-by-node way using the pipeline scheme.

All transfer information items determined to be related to a destination address are copied from the shared distributed routing tables 202 to the local routing table 201. When compared with a method in which only one transfer information item perfectly corresponding to the destination address is copied from the shared distributed routing table 202, the number of searches through the shared distributed routing tables 202 is reduced. It is hence possible to remove the memory access bottleneck which takes place when a plurality of line cards 100 makes a search through the shared distributed routing tables 202.

The numeric values used in the first embodiment are only examples for reference. Various configurations can be implemented by using different values for, for example, the number of nodes in the m-Trie algorithm, the dividing position of an IP address for a search key, and the number of entries. The present invention is also applicable to a search for an MAC address not using the longest prefix match. In a case of a routing table for a MAC address, there does not exist the concept of the prefix length. Therefore, the field of the prefix length is not necessary in the routing table. In the local routing table 201, one entry is always used in each node of the respective higher-level to the lower-level nodes.

Also, a routing table for IPv6 using the longest prefix match can be implemented according to an idea similar to that of the first embodiment.

Second Embodiment

In the description of the first embodiment, the control line card 300 includes the perfect routing table 301. It is also possible that the packet transfer apparatus operates without using the perfect routing table 301. In this situation, the shared distributed routing table 202 and the control CPU 110 of each line card 100 distinctively control an address search condition area designated for the shared distributed routing table 202 and the control CPU 110.

In this case, a routing protocol, e.g., Open Shortest Path First (OSPF), Routing Information Protocol (RIP), or BGP is operated on the control CPU 110 of each line card 100 such that the CPU 110 controls the routing table only for distributed addresses to be controlled by the CPU 110. When viewed from other packet transfer apparatuses, the routing protocol is operating under control of a single CPU. However, in the concerned packet transfer apparatus, a plurality of control CPUs 110 cooperate with each other to control the shared distributed routing tables 202.

The registration, the access method, and the update method of the local routing table 201 and the access method of the shared distributed routing table 202 can be similarly treated as in the first embodiment excepting the operation for the perfect routing table 301.

According to the second embodiment, the packet transfer apparatus is configured without using the control card 300. This advantageously reduces the resources mounted in the packet transfer apparatus.

Third Embodiment

In conjunction with the first and second embodiments, description has been given of the configuration of the local routing table and that of the shared distributed routing table which can cope with the longest prefix match. Since data is communicated in units of plural packets between the terminals on the network, there exists temporal locality in which a large amount of packets having the same IP address appear in a short period of time. Therefore, in the embodiments of the shared distributed routing tables described above, by additionally using a routing cache table including a memory having an operation speed higher than that of the memory used for the local routing table, there can be configured an embodiment implementing the routing table access at a higher speed.

Specifically, in the line card 100 of FIG. 1, the route search engine 105 includes a routing table cache memory independent of the local routing table 201 and the shared distributed routing table 202. The routing table cache keeps part of information of the local routing table 201 as an entry perfectly matching an IP address used as a search key.

Description will now be given of an operation example. It is assumed that the shared distributed routing table 202 keeps, for example, an IP address condition of 111.222.3.4/24. The search is successively conducted ten times by use of an IP address key in which the IP address in the last part of the IP address key is incremented by one up to 100 from 111.222.3.1 to 111.222.3.100.

In the situation, the local routing table 201 copies, in one sequence of registering operation steps, an IP address condition corresponding to 111.222.3.4/24 from the shared distributed routing table 202 and hence the first search according to 111.222.3.1 takes a long period of time. However, each of the searches up to 111.222.3.100 take a period of time less than that of the first search according to 111.222.3.1 since the IP address condition has already been registered to the local routing table 201. The nine subsequent sequential searches beginning from 111.222.3.1 to 111.222.3.100 can be conducted using only the local routing table 201.

The routing table cache causes a cache miss for the first search in the range from 111.222.3.1 to 111.222.3.100. For each search, it is hence required to copy corresponding information (a next hop IP address and an output line number) from the local routing table 201 onto the routing table cache entry. The nine subsequent sequential searches in the range from 111.222.3.1 to 111.222.3.100 can be conducted using only the routing table cache. Thanks to the high-speed routing table cache, the search time can be expectedly reduced.

In a case in which the routing table cache is used, if an entry of the local routing table 201 is invalidated or updated, a corresponding entry of the routing table cache is also invalidated or updated.

The third embodiment additionally requires a memory and a control mechanism for the routing table cache. Therefore, this is suitable for a case in which a high-speed routing table search is desired even if increase in the quantity of hardware resources is allowed.

In the method of distributing routing tables according to the present invention, it is possible by using two kinds of routing tables to implement a high-speed routing table search while increasing the number of entries registrable to the routing tables. Therefore, the present invention is applicable to high-speed packet transfer apparatuses including a router and an L3 switch as representative examples.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A packet transfer apparatus, comprising:
   a plurality of line cards;
   a control card; and
   a switch fabric, wherein:
   each of the plurality of line cards comprises:
      at least one input line for inputting a packet from a network outside the apparatus;
      at least one output line for outputting the packet to the network outside the apparatus;
      an internal line for communicating the packet with the network in the apparatus;
      a first routing table for recording a plurality of transfer information items each corresponding to a destination address;
      a second routing table for recording the plurality of transfer information items each corresponding to the destination address;
      a route search engine for searching the first or second routing table, by using as a search key the destination address included in a packet received from the input line, for a transfer information item corresponding to the destination address;
      a packet processor for issuing a search request to the route search engine, receiving the transfer information item as a result of the search, conducting a process required for the packet, and transferring the packet to the internal or output line; and
      a first control Central Processing Unit (CPU);
   the control card comprises:
      a third routing table for recording the plurality of transfer information items each corresponding to the destination address; and
      a second control CPU having a function to control the third routing table;
   the switch fabric transfers in the apparatus a packet to the packet processor associated with the output line designated for the packet;
   the third routing table records all transfer information items in the packet transfer apparatus;
   the second routing table records a part of the transfer information items of the third routing table, and the part of the transfer information items are different from a part thereof recoded in any other second routing table; and
   the first routing table reads from the transfer information items of the second routing tables only transfer information items belonging to a destination used for an information transfer operation and transfer information items belonging to a group to which the destination belongs, from the second routing tables keeping the transfer information items.

2. A packet transfer apparatus, comprising:
   a plurality of first routing tables for recording a plurality of transfer information items each corresponding to a destination address; and
   a plurality of second routing tables for recording a plurality of transfer information items each corresponding to the destination address, wherein:
   the second routing tables respectively record parts of the transfer information items, and the parts of the transfer information items are different from each other between the second routing tables;
   each of the first routing table reads from the transfer information items of the second routing tables only transfer information items belonging to a destination used for an information transfer operation and transfer information items belonging to a group to which the destination belongs, from the second routing tables keeping the transfer information items;
   the first routing table keeps information indicating which one of the first and second routing tables has recorded transfer information items corresponding to the destination address; and
   each of the second routing tables keeps information indicating which one of the first routing tables has recorded the transfer information items corresponding to the destination address.

3. A packet transfer apparatus, comprising:
   a plurality of first routing tables for recording a plurality of transfer information items each corresponding to a destination address;

a plurality of second routing tables for recording a plurality of transfer information items each corresponding to the destination address, a route search engine for searching one of the first or second routing tables using as a search key a destination address contained in a packet received from an input line; and a third routing table for recording a plurality of transfer information items each corresponding to the destination address, wherein:

the third routing table records all transfer information items in the packet transfer apparatus;

the second routing tables respectively record parts of the transfer information items of routing tables in the packet transfer apparatus, and the parts of the transfer information items are different from each other between the second routing tables;

each of the first routing table reads from the transfer information items of the second routing tables only transfer information items belonging to a destination used for an information transfer operation and transfer information items belonging to a group to which the destination belongs, from the second routing tables keeping the transfer information items;

the first routing tables and the second routing tables are configured using an M-Trie algorithm; and the first routing tables and the second routing tables include Static Random Access Memories (SRAMs) or Dynamic RAMs (DRAMs).

4. The packet transfer apparatus according to claim 1, wherein the group of the transfer information items which the first routing table records includes the all transfer information items for which a longest prefix match is possible.

5. The packet transfer apparatus according to claim 1, wherein:

the first and second routing tables includes a plurality of nodes each keeping a plurality of entries;

each entry of a highest-level node of the first routing table includes:
information indicating that the entry has been registered to the apparatus;
the information indicating that the entry has been registered to the first routing table;
information representing a prefix length of a destination Internet Protocol (IP) address;
information indicating a line card number of the second routing table in which the entry exists; and
a pointer to indicate a lower-level node of the entry;

each entry of a highest-level node of the second routing table includes:
information indicating validity of the entry;
information representing a prefix length of a destination IP address;
information indicating a line card number of the first routing table onto which the entry has been copied; and
a pointer to indicate a lower-level node of the entry;

each entry of a lower-level node other than a lowest-level node of each of the first and second routing tables includes:
information indicating validity of the entry;
information representing a prefix length of a destination IP address; and
a pointer to indicate a lower-level node of the entry; and each entry of the lowest-level node of each of the first and second routing tables includes:
information indicating validity of the entry;
information representing a prefix length of a destination IP address; and
a pointer to indicate a transfer information item or an entry in a memory in which the transfer information item is stored.

6. The packet transfer apparatus according to claim 1, wherein:

the route search engine makes a search through the first routing table;

the route search engine reads, if the first routing table includes a transfer information item corresponding to the search key, the transfer information item from the first routing table;

the route search engine issues, if the first routing table does not include the transfer information item corresponding to the search key, a request for the transfer information to an associated one of the second routing tables;

the associated second routing table records a line card number including the first routing table as a request source of the request, and collects a concerned information item and the group of transfer information items and transmits the concerned information item and the group of transfer information items to the first line card as the request source; and the line card as the request source updates concerned entries of the first routing table using the concerned information item and the group of transfer information items, records an information item indicating that the transfer information item exists in the first routing table, and reads the transfer information therefrom.

7. The packet transfer apparatus according to claim 1, wherein:

the control CPU of the control card communicates with a second packet transfer apparatus and updates the third routing table, and issues an update request to the line card including a concerned entry of the transfer information item;

the line card updates the concerned entry of the second routing table in response to the update request;

the second control CPU notifies necessary information to the line card if the entry of the second routing table is shared by the first routing table including an own card; and the line card updates or invalidates the first routing tables using the information.

8. The packet transfer apparatus according to claim 1, wherein:

the third routing tables also keep the information items distributed to the respective line cards in a way similar to that of the second routing tables; and the second control CPU of each of the line cards independently updates a part of the third routing table assigned to a control table.

9. The packet transfer apparatus according to claim 1, wherein:

the third routing tables are dispensed with; and the second routing tables serve functions of the third routing tables.

10. The packet transfer apparatus according to claim 1, wherein:

when the first routing table does not include the transfer information items and hence a request for the transfer information items is issued to the second routing table, the second routing table of the line card communicates via a second switch fabric with the switch fabric used for the packet transfer.

11. The packet transfer apparatus according to claim 1, wherein in the operation to update the second routing table, only differential information of the update is used to update the first routing table in the shared state.

12. The packet transfer apparatus according to claim 1, further comprising a routing table cache between the first routing tables and the path search engine for recording therein the entries to be frequently used, in a perfect matching state.

* * * * *